US008564891B2

(12) United States Patent
Kasumi et al.

(10) Patent No.: US 8,564,891 B2
(45) Date of Patent: Oct. 22, 2013

(54) HOLDING APPARATUS, OPTICAL APPARATUS, AND TELESCOPE

(75) Inventors: Kazuyuki Kasumi, Utsunomiya (JP); Kouhei Imoto, Saitama (JP)

(73) Assignee: Canon Kabushiki Kaisha (JP)

( * ) Notice: Subject to any disclaimer, the term of this patent is extended or adjusted under 35 U.S.C. 154(b) by 248 days.

(21) Appl. No.: 13/089,750

(22) Filed: Apr. 19, 2011

(65) Prior Publication Data
US 2011/0261448 A1    Oct. 27, 2011

(30) Foreign Application Priority Data

Apr. 21, 2010    (JP) ................................. 2010-098126

(51) Int. Cl.
*G02B 7/02*    (2006.01)
(52) U.S. Cl.
USPC ......................................... 359/813
(58) Field of Classification Search
USPC ........................ 359/811, 813, 819, 820, 822
See application file for complete search history.

(56) References Cited

U.S. PATENT DOCUMENTS 6,392,825 B1 *    5/2002    Trunz et al. ................... 359/819

FOREIGN PATENT DOCUMENTS

JP    6-230274 A    8/1994
JP    3345920 B2    11/2002

* cited by examiner

*Primary Examiner* — Joseph P Martinez
(74) *Attorney, Agent, or Firm* — Rossi, Kimms & McDowell LLP

(57) ABSTRACT

The present invention provides a holding apparatus for holding an optical element with an edge whose thickness increases or decreases inwardly, the apparatus including a barrel having an internal diameter larger than an external diameter of the optical element, a support configured to support and position the optical element relative to the barrel via a first surface of the edge in a direction of an axis of the barrel, and a restriction device including a regulation member which faces a second surface of the edge opposite to the first surface in the direction of the axis, is apart from the second surface if an amount of decentering of the optical element is less than a predetermined amount within a tolerance, and contacts with the second surface if the amount of decentering reaches the predetermined amount, and configured to restrict decentering of the optical element.

9 Claims, 7 Drawing Sheets

HOLDING APPARATUS, OPTICAL APPARATUS, AND TELESCOPE

BACKGROUND OF THE INVENTION

1. Field of the Invention

The present invention relates to a holding apparatus, optical apparatus, and telescope.

2. Description of the Related Art

A holding apparatus holding an optical element such as a lens generally inserts an optical element having a rotational symmetrical shape with respect to an optical axis into a lens barrel having a cylindrical shape coaxial with the optical axis until one surface of the optical element abuts against the lens barrel, and presses the other surface of the optical element with a fixing member (press ring). As a method of pressing an optical element in the direction of an optical axis, Japanese Patent No. 3345920 has proposed a method of pressing an optical element by screwing male threads (or female threads) on the outer circumferential surface of a press ring into female threads (or male threads) on the inner circumferential surface of the lens barrel, and a method of pressing an optical element using an elastic member such as a spring.

FIGS. 7A and 7B are views each showing the arrangement of a conventional holding apparatus. The holding apparatus shown in FIG. 7A has a structure to press an optical element OE inserted into a lens barrel (main body) LB in the direction of an optical axis with a press ring PR and a shoulder unit BP. More specifically, the optical element OE is clamped and fixed (held) between the press ring PR and the shoulder unit BP by screwing male threads SW formed on the outer circumferential surface of the press ring PR into female threads NT formed on the inner circumferential surface of the lens barrel LB. On the contrary, the holding apparatus shown in FIG. 7B has a structure to press a press ring PR against an optical element OE with a compression spring CS clamped between the press ring PR and a press plate PB.

A conventional holding apparatus determines the position of an optical element with a shoulder unit with respect to an optical axis, and achieves necessary positional accuracy (decentering accuracy) by making the internal diameter of a lens barrel and the external diameter of the optical element equal to each other with respect to a direction (decentering direction) perpendicular to the optical axis. A lateral shift (positional shift in the decentering direction) of the optical element within the lens barrel depends on the processing accuracy of the internal diameter of the lens barrel.

If such a conventional holding apparatus is used to hold a large diameter optical element, however, the processing accuracy is insufficient. It is thus impossible to satisfy specifications required for the holding apparatus to hold the large diameter optical element.

In the astronomical field, for example, an optical element mounted on a reflecting telescope or the like has a larger diameter in recent years, and an optical element having a diameter of about 1 m is used. Such telescope is required to align (in a decentering direction) an optical element having a diameter of 1 m with respect to an optical axis on the order of $1/100$ mm (that is, a decentering accuracy of $1/100$ mm is required). When applying a conventional holding apparatus to a telescope, therefore, it is necessary to process the internal diameter of a lens barrel with an accuracy of $1/100$ mm in order to satisfy the decentering accuracy requirement. Note that it is extremely difficult and impractical to process (finish) the internal diameter of a lens barrel having a diameter of 1 m with an accuracy of $1/100$ mm even if a processing apparatus or high technology for enabling high accuracy processing is used. Furthermore, since an optical element with a diameter of 1 m is very heavy (several tens kg), an assembly operation of inserting the optical element into a lens barrel having a clearance of only about $1/100$ mm is also extremely difficult, and a special jig, tool, and skill are necessary.

SUMMARY OF THE INVENTION

The present invention provides, for example, a holding apparatus advantageous in terms of restriction of optical element decentering, and simplicity of processing thereof and insertion of the optical element thereto.

According to one aspect of the present invention, there is provided a holding apparatus for holding an optical element with an edge whose thickness increases or decreases inwardly, the apparatus including a barrel having an internal diameter larger than an external diameter of the optical element, a support configured to support and position the optical element relative to the barrel via a first surface of the edge in a direction of an axis of the barrel, and a restriction device including a regulation member which faces a second surface of the edge opposite to the first surface in the direction of the axis, is apart from the second surface if an amount of decentering of the optical element is less than a predetermined amount within a tolerance, and contacts with the second surface if the amount of decentering reaches the predetermined amount, and configured to restrict decentering of the optical element.

Further features of the present invention will become apparent from the following description of exemplary embodiments with reference to the attached drawings.

DESCRIPTION OF THE EMBODIMENTS

Figure 1A:
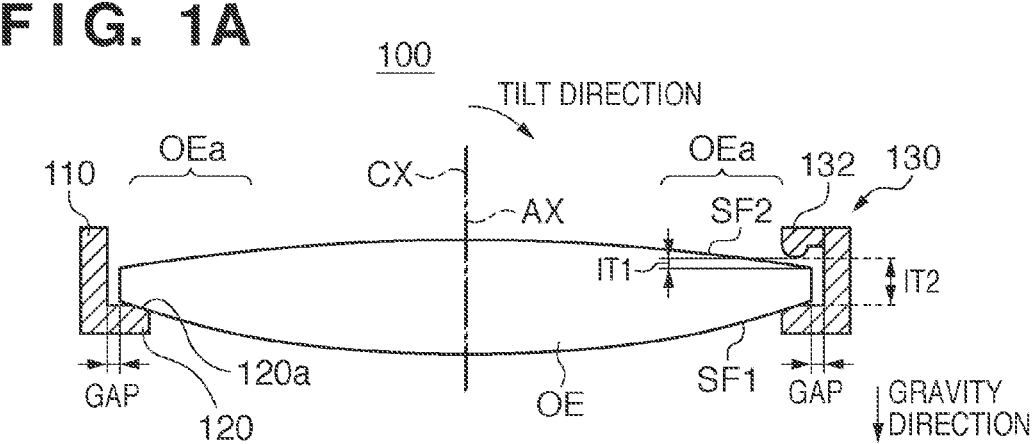
FIGS. 1A to 1C are schematic views each showing the arrangement of a holding apparatus according to the first embodiment of the present invention.

Preferred embodiments of the present invention will be described below with reference to the accompanying drawings. Note that the same reference numerals denote the same members throughout the drawings, and a repetitive description thereof will not be given.

First Embodiment

Figure 1B:
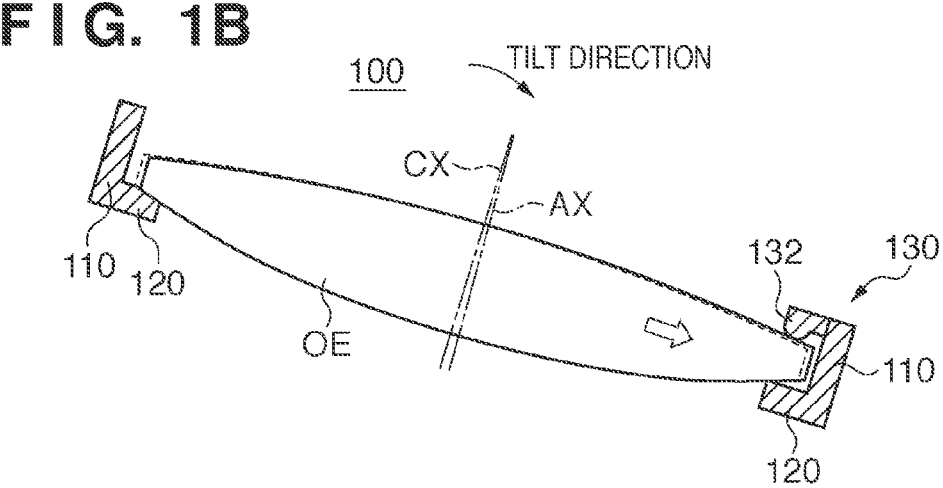
Figure 1C:
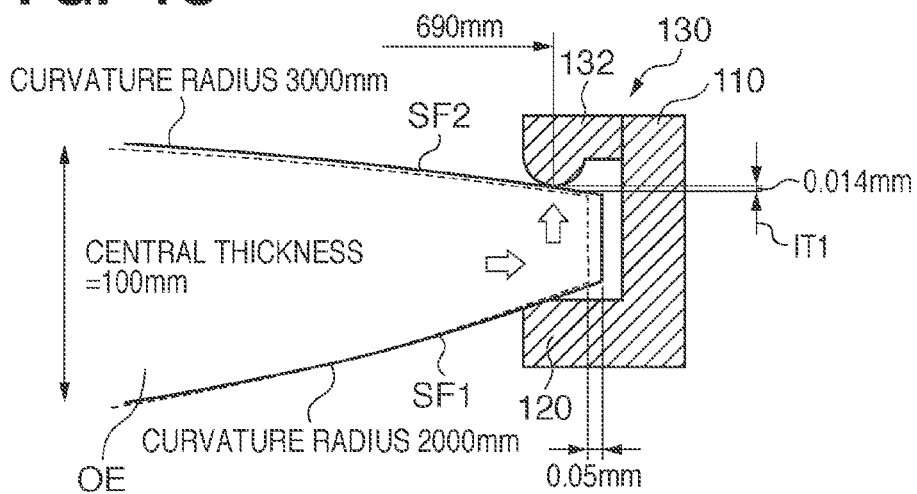

FIGS. 1A to 1C are schematic views each showing the arrangement of a holding apparatus 100 according to the first embodiment of the present invention. As shown in FIGS. 1A to 1C, the holding apparatus 100 includes a lens barrel 110, a supporting unit 120, and a restriction unit 130, and holds a large diameter optical element OE (for example, a lens having a diameter of 1 m or the like) mounted on an optical apparatus such as a telescope. The optical element OE has a shape with a thickness that increases or decreases inwardly (that is, toward an optical axis AX of the optical element OE) on its outer peripheral portion (edge) OEa, and it is a convex lens having a biconvex shape in this embodiment.

The lens barrel 110 has an internal diameter larger than the external diameter of the optical element OE, and encloses the optical element OE with a sufficient gap (for example, about 1 mm) with respect to the outer peripheral portion OEa of the optical element OE. Since the lens barrel 110 need only have an adequate gap with respect to the outer peripheral portion OEa of the optical element OE, it is not required to have high accuracy of the dimension of the internal diameter, circularity, and coaxiality of the lens barrel 110. Note that each of the upper and lower surfaces of the lens barrel 110 has a flange unit for stacking a plurality of holding apparatuses 100 (that is, forming an optical system).

The supporting unit 120 is coupled to the lens barrel 110, and supports (places) and positions the optical element OE on a supporting surface 120a. In this embodiment, the supporting unit 120 is embodied as a shoulder unit integrally formed with the lens barrel 110. Note that the supporting surface 120a allows the optical element OE to move (be decentered) in a direction (first direction) perpendicular to the optical axis AX while supporting the optical element OE by a first surface SF1 of the outer peripheral portion OEa in the direction of the optical axis AX. The supporting surface 120a has, for example, an inclined surface or spherical shape corresponding to the shape of the optical element OE. Note that if the optical element OE has a very large curvature radius or flat surface, the supporting surface 120a has a shape to allow the optical element OE to move in the direction perpendicular to the optical axis AX irrespective of the shape of the optical element OE.

The restriction unit 130 includes a stop member (regulation member) 132 facing a second surface SF2 of the outer peripheral portion OEa, which is on the opposite side of the first surface SF1 of the outer peripheral portion OEa. The restriction unit 130 is disposed in the lens barrel 110 on its side where the optical system including the holding apparatus 100 holding the optical element OE tilts downward (in a tilt direction).

As shown in FIG. 1A, when the optical element OE is positioned at an initial position (a position at which the optical axis AX of the optical element OE and a central axis CX of the lens barrel 110 coincide with each other), there is an interval IT1 between the second surface SF2 of the outer peripheral portion OEa and the stop member 132. Note that when the optical system including the holding apparatus 100 which holds the optical element OE tilts in the gravity direction, a force acts on the optical element OE in the direction perpendicular to the optical axis AX, and consequently the optical element OE moves in the direction perpendicular to the optical axis AX, as shown in FIG. 1B. Then, when the optical element OE moves to some extent, the second surface SF2 of the outer peripheral portion OEa abuts against the stop member 132. The optical element OE, therefore, cannot move in the direction perpendicular to the optical axis AX any more. Note that at this time, there is a gap between the external diameter of the optical element OE and the internal diameter of the lens barrel 110, and it is not the internal diameter of the lens barrel 110 which restricts the movement of the optical element OE in the direction perpendicular to the optical axis AX. As described above, the stop member 132 does not contact with the second surface SF2 of the outer peripheral portion OEa of the optical element OE while the interaxial distance between the optical axis AX of the optical element OE and the central axis CX of the lens barrel 110 in the direction perpendicular to the optical axis AX falls within a predetermined distance range. When the optical element OE moves in the direction perpendicular to the optical axis AX and the interaxial distance falls outside the predetermined distance range, the stop member 132 abuts against the second surface SF2 of the outer peripheral portion OEa of the optical element OE to restrict the movement of the optical element OE. In other words, when the amount of decentering of the optical element OE is less than a predetermined amount within a tolerance, the stop member 132 has an interval to the second surface SF2 of the outer peripheral portion OEa of the optical element OE. When the amount of decentering of the optical element OE reaches the predetermined amount, the stop member 132 contacts with the second surface SF2 of the outer peripheral portion OEa of the optical element OE. It is, therefore, possible to restrict a range within which the optical element OE can move in the direction perpendicular to the optical axis AX by restricting the interval IT1, that is, an interval IT2 between the supporting surface 120a of the supporting unit 120 and the stop member 132 in a direction parallel to the optical axis AX.

FIG. 1C shows numerical examples of the holding apparatus 100 in this embodiment. Assume that the external diameter of the optical element OE is 690 mm, the curvature radius of the first surface SF1 of the optical element OE (outer peripheral portion OEa) is 2000 mm, the curvature radius of the second surface SF2 of the optical element OE is 3000 mm, and the central thickness of the optical element OE is 100 mm. Assume also that a range (decentering tolerance) within which the optical element OE can move in the direction perpendicular to the optical axis AX is 0.05 mm. In this case, if the interval IT1 between the second surface SF2 of the outer peripheral portion OEa and the stop member 132 in the direction parallel to the optical axis AX is set (adjusted) to 0.014 mm, the optical element OE cannot move in the direction perpendicular to the optical axis AX by 0.05 mm or more. To set the interval IT1 to 0.014 mm, the stop member 132 is attached between the second surface SF2 and the stop member 132 while sandwiching a foil with a thickness of 0.014 mm between them, and then the foil is removed. Furthermore, it is also possible to set using a micrometer or the like the interval IT1 to 0.014 mm by moving the stop member 132 in the direction of the optical axis AX by 0.014 mm from a position at which the stop member 132 abuts against the second surface SF2 of the optical element OE (outer peripheral portion OEa).

As described above, the holding apparatus 100 of this embodiment does not need special processing (high-accuracy processing technique), has an advantage in manufacturing, and can satisfy specifications required for the holding apparatus holding a large diameter optical element.

On the contrary, a conventional holding apparatus restricts the movement (decentering) of an optical element in a direction perpendicular to an optical axis by the internal diameter of a lens barrel corresponding to the external diameter of the optical element, as described above. It is, therefore, required to finish the external diameter of the optical element with high accuracy of 700 mm. To insert the optical element into the lens barrel, it is necessary to have a gap of about 0.02 mm between the external diameter of the optical element and the internal diameter of the lens barrel. The internal diameter of the lens barrel thus needs to be processed so as to have a gap of at least 0.02 mm or more with respect to the external diameter of the optical element. Furthermore, to restrict the movement of the optical element in the direction perpendicular to the optical axis, a gap between the external diameter of the optical element and the internal diameter of the lens barrel must be 0.05 mm (a decentering tolerance) or less. As a result, it is necessary to process the internal diameter of the lens barrel with accuracy of +0.02 mm to +0.05 mm with respect to 700 mm. It is extremely difficult to attain such processing.

Second Embodiment

Figure 2A:
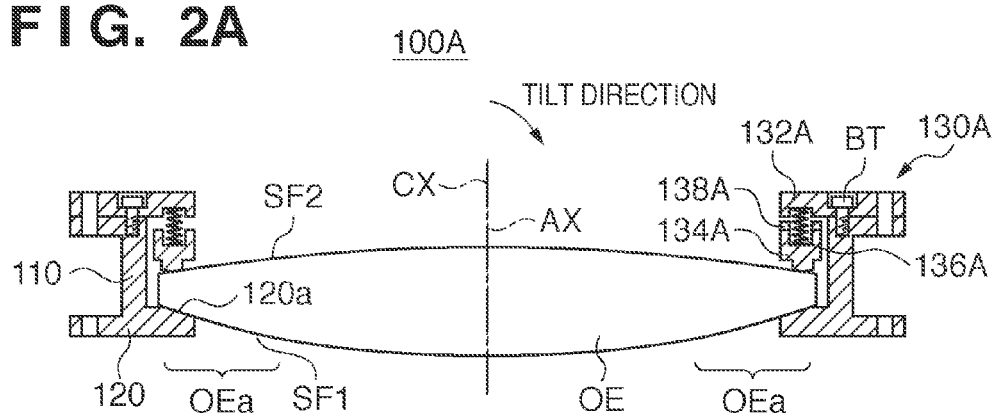
FIGS. 2A to 2C are schematic views each showing the arrangement of a holding apparatus according to the second embodiment of the present invention.
Figure 2B:
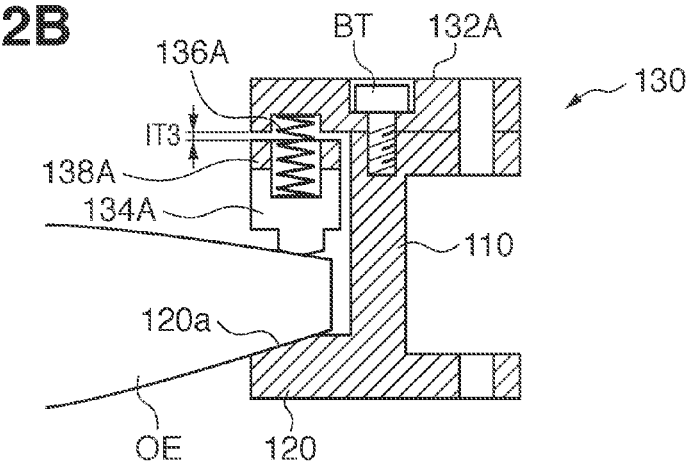
Figure 2C:
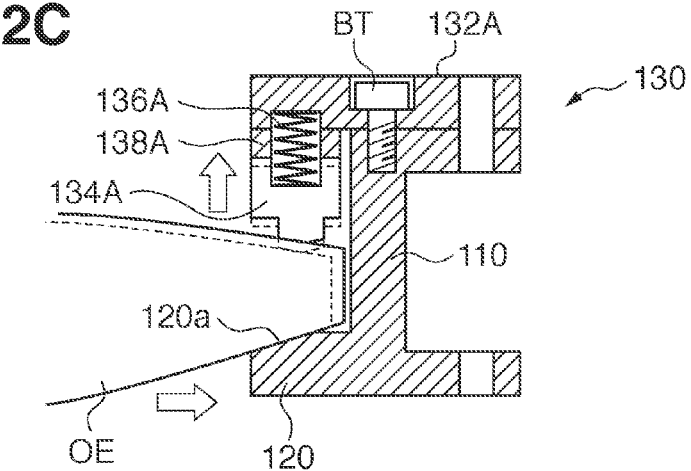

FIGS. 2A to 2C are schematic views each showing the arrangement of a holding apparatus 100A according to the second embodiment of the present invention. The holding apparatus 100A basically includes the same arrangement as that of the holding apparatus 100, and holds an optical element OE. Note that the holding apparatus 100A includes a restriction unit 130A with an arrangement different from that of the restriction unit 130 in place of the restriction unit 130. More specifically, the restriction unit 130A includes a press plate 132A as a stop member (regulation member), a press ring 134A, spring members 136A, and spacers 138A. In this embodiment, the optical element OE is a convex lens having a biconvex shape.

The press plate 132A is a ring-shaped member having the same size as the external diameter of a lens barrel 110. The press plate 132A is fixed on the lens barrel 110 using a fastening bolt BT, and has a function of compressing the spring members 136A.

The press ring 134A is a press member which is disposed between a second surface SF2 of an outer peripheral portion OEa of the optical element OE and the press plate 132A, and presses the optical element OE in the direction of an optical axis AX (that is, presses the second surface SF2 of the outer peripheral portion OEa in the direction of the optical axis AX). Note that a portion of the press ring 134A contacting with the optical element OE is processed to have a convex shape or conical shape. The press ring 134A and the optical element OE contact with each other in a circular pattern. Note that a plurality of counterbored holes for receiving the spring members 136A are formed on a circumference on the upper surface of the press ring 134A.

For example, the spring members 136A are inserted into the counterbored holes formed on the upper surface of the press ring 134A, and clamped between the press plate 132A and the press ring 134A in a compressed state. The spring members 136A apply a compression load to the press ring 134A in the direction of the optical axis AX. In this way, the spring members 136A push the press ring 134A against the second surface SF2 of the outer peripheral portion OEa of the optical element OE while allowing the displacement of the press ring 134A in the direction of the optical axis AX of the optical element OE.

The spacers 138A are adjustment units which are disposed between the press plate 132A and press ring 134A, and adjust an interval formed between the press plate 132A and the press ring 134A. Each spacer 138A has a ring shape with a hole for receiving the corresponding spring member 136A in this embodiment. FIG. 2A shows the spacer 138A only on the side (right side of FIG. 2A) where the holding apparatus 100A tilts downward, and a spacer on the left side of FIG. 2A is omitted.

Figure 3:
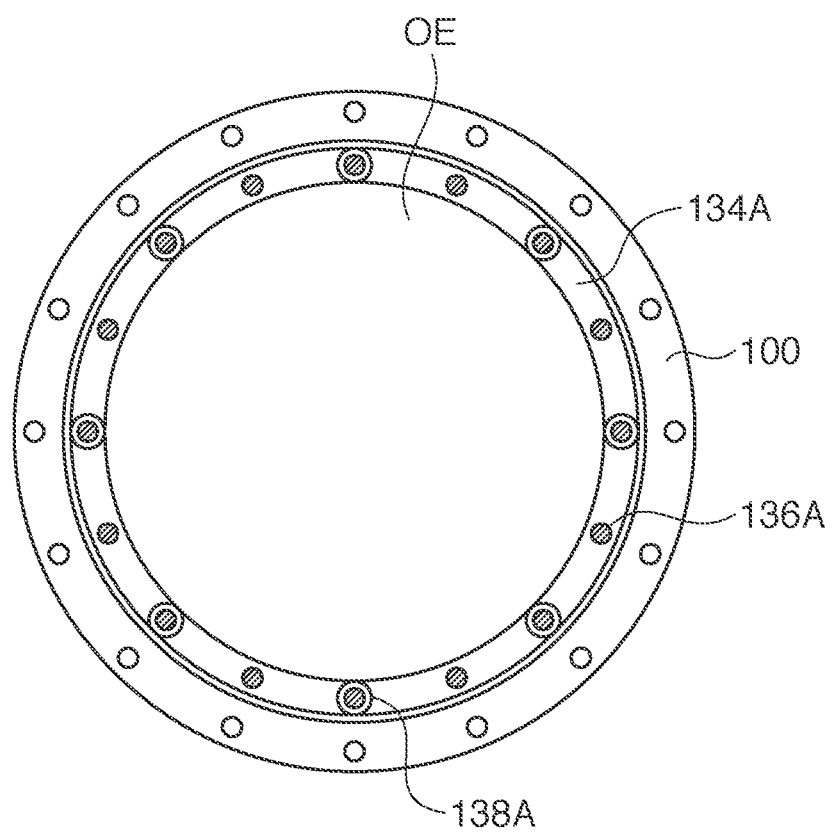
FIG. 3 is a view showing a positional relationship between spring members and spacers included in a restriction unit of the holding apparatus shown in FIG. 2A, 2B, or 2C.

FIG. 3 is a view showing a positional relationship between the spring members 136A and the spacers 138A included in the restriction unit 130A of the holding apparatus 100A. FIG. 3 shows the holding apparatus 100A when viewed from above. Note that FIG. 3 does not show the press plate 132A and fastening bolt BT. In this embodiment, the spring members 136A are disposed at 16 positions at regular intervals on a circumference. The spacers 138A are disposed at 8 positions at regular intervals on a circumference. The spring members 136A and the spacers 138A, however, need only be disposed at regular intervals on a circumference, and the number of spring members 136A or spacers 138A is not limited.

As shown in FIG. 2B, when the optical element OE is positioned at an initial position (a position at which the optical axis AX of the optical element OE and a central axis CX of the lens barrel 110 coincide with each other), there is an interval IT3 between the press plate 132A and spacer 138A. Note that when an optical system including the holding apparatus 100A which holds the optical element OE tilts in the gravity direction, a force acts on the optical element OE in a direction perpendicular to the optical axis AX and consequently the optical element OE moves in the direction perpendicular to the optical axis AX, as shown in FIG. 2C. Then, when the optical element OE moves to some extent, the second surface SF2 of the outer peripheral portion OEa pushes up the press ring 134A to compress the spring member 136A. As a result, the spacer 138A abuts against the press plate 132A and thus the optical element OE cannot move in the direction perpendicular to the optical axis AX any more. Note that at this time, there is a gap between the external diameter of the optical element OE and the internal diameter of the lens barrel 110, so it is not the internal diameter of the lens barrel 110 which restricts the movement of the optical element OE in the direction perpendicular to the optical axis AX. As described above, the spacer 138A does not contact with the press plate 132A while the interaxial distance between the optical axis AX of the optical element OE and the central axis CX of the lens barrel 110 in the direction perpendicular to the optical axis AX falls within a predetermined distance range. When the optical element OE moves in the direction perpendicular to the optical axis AX and the interaxial distance falls outside the predetermined distance range, the second surface SF2 of the outer peripheral portion OEa of the optical element OE pushes up the spacer 138A through the press ring 134A. As a result, the spacer 138A abuts against the press plate 132A to restrict the movement of the optical element OE. It is, therefore, possible to restrict a range within which the optical element OE can move in the direction perpendicular to the optical axis AX by adjusting (defining) the interval IT3 with the thickness of the spacer 138A.

Assume, for example, that the external diameter of the optical element OE is 690 mm, the curvature radius of the first surface SF1 of the optical element OE (outer peripheral portion OEa) is 2000 mm, the curvature radius of the second surface SF2 of the optical element OE is 3000 mm, and the central thickness of the optical element OE is 100 mm. Assume also that a range (decentering tolerance) within which the optical element OE can move in the direction perpendicular to the optical axis AX is 0.05 mm. In this case, if the interval IT3 between the press plate 132A and the spacer 138A in the direction parallel to the optical axis AX is set to 0.014 mm by adjusting the thickness of the spacer 138A, the optical element OE cannot move in the direction perpendicular to the optical axis AX by 0.05 mm or more. Note that since the spacer 138A generally has a size with a diameter of about 10 mm and a thickness of about 5 mm, it is easy to process (adjust) the thickness with an accuracy of 0.001 mm.

A procedure for determining the thickness of the spacer 138A will now be explained. The optical element OE is inserted into the lens barrel 110 and the optical axis AX of the optical element OE and the central axis CX of the lens barrel 110 are made coincide with each other. In this state, a supporting unit 120 (supporting surface 120a) supports the optical element OE. To make the optical axis AX of the optical element OE and the central axis CX of the lens barrel 110 coincide with each other, the optical element OE and the lens barrel 110 are disposed on a rotary table, and the runouts of the optical element OE and lens barrel 110 are measured while rotating the rotary table. The optical element OE and lens barrel 110 are aligned with each other on the rotary table so that their runouts become zero. With this operation, each of the optical axis AX of the optical element OE and the central axis CX of the lens barrel 110 coincides with the rotation axis of the rotary table. Consequently, the optical axis AX of the optical element OE and the central axis CX of the lens barrel 110 coincide with each other. Subsequently, the press ring 134A is disposed on the optical element OE. The press plate 132A is fixed on the lens barrel 110 using the fastening bolt BT while clamping the spring members 136A between the press plate 132A and the press ring 134A. At this time, no spacer 138A is disposed between the press plate 132A and the press ring 134A. Then an interval between the press plate 132A and the press ring 134A is measured by a block gauge or the like, thereby determining the thickness of the spacer 138A based on the measured value. In this embodiment, the thickness of the spacer 138A is set to a value smaller than the measured value of the interval between the press plate 132A and the press ring 134A by 0.014 mm. When the thickness of the spacer 138A is determined, the spacer 138A is processed to have that thickness. The press plate 132A is removed from the lens barrel 110, the spacers 138A are disposed between the press plate 132A and the press ring 134A, and the press plate 132A is fixed again on the lens barrel 110.

As described above, the holding apparatus 100A of this embodiment does not need special processing (high-accuracy processing technique), has an advantage in manufacturing, and can satisfy specifications required for the holding apparatus holding a large diameter optical element.

Assume that the curvature radius of the first surface SF1 of the optical element OE is R, the second surface SF2 of the optical element OE is flat surface, and the decentering tolerance of the optical element OE is $\Delta x$. Then, an interval s between the press plate 132A and the press ring 134A to be set by the spacer 138A can be approximated by $$s = \frac{r}{R}\sqrt{\Delta x^2 + \left\{\sqrt{R^2 - r^2} - \sqrt{R^2 - (r + \Delta x)^2}\right\}^2}$$

where r is the distance between the central position of the optical element OE before decentering and a position where the press ring 134A keeps the second surface SF2 of the optical element OE, and t is the thickness of the optical element OE at the position where the press ring 134A keeps the second surface SF2 of the optical element OE, with $\Delta x$ being small enough as compared with R and r ($R \gg \Delta x$ and $r \gg \Delta x$).

In this embodiment, as described above, the spacer 138A has a ring shape with a hole for receiving the spring member 136A, thereby preventing it from dropping off within the lens barrel 110. Note that if each spacer 138A has a horseshoe shape and a part for closing the horseshoe-shaped opening is added, it is possible to dispose the spacers 138A between the press plate 132A and the press ring 134A without removing the press plate 132A from the lens barrel 110.

An adjustment member for adjusting the interval formed between the press plate 132A and press ring 134A is not limited to the spacer 138A. For example, the interval formed between the press plate 132A and press ring 134A may be adjusted by disposing precisely processed threads on the press plate 132A or press ring 134A.

It is also possible to restrict a range within which the optical element OE can move in the direction perpendicular to the optical axis AX by, for example, changing a position at which the press plate 132A is fixed on the lens barrel 110 and adjusting (defining) the interval between the press plate 132A and the press ring 134A without using the spacers 138A. In this case, when the amount of decentering of the optical element OE is less than a predetermined amount within a tolerance, there is an interval between the press plate 132A and the press ring 134A. When the amount of decentering of the optical element OE reaches the predetermined amount, the press plate 132A and press ring 134A contact with each other to restrict the decentering of the optical element OE. Consequently, when the optical element OE moves in the direction perpendicular to the optical axis AX, the second surface SF2 of the outer peripheral portion OEa pushes up the press ring 134A to compress the spring member 136A. Then, the press ring 134A abuts against the press plate 132A, and the optical element OE cannot move in the direction perpendicular to the optical axis AX any more.

Figure 4A:
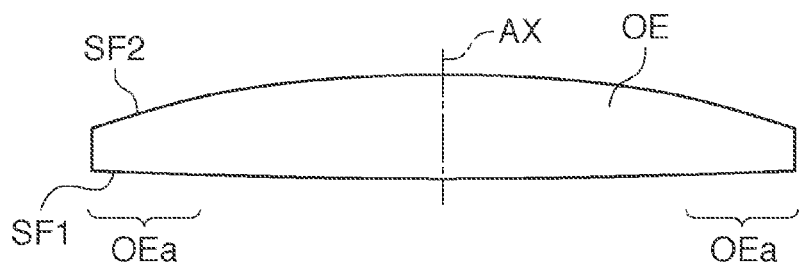
FIGS. 4A to 4C are views for explaining the holding apparatus according to the second embodiment of the present invention.
Figure 4B:
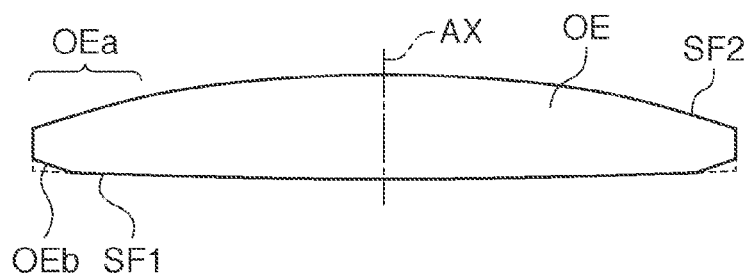
Figure 4C:
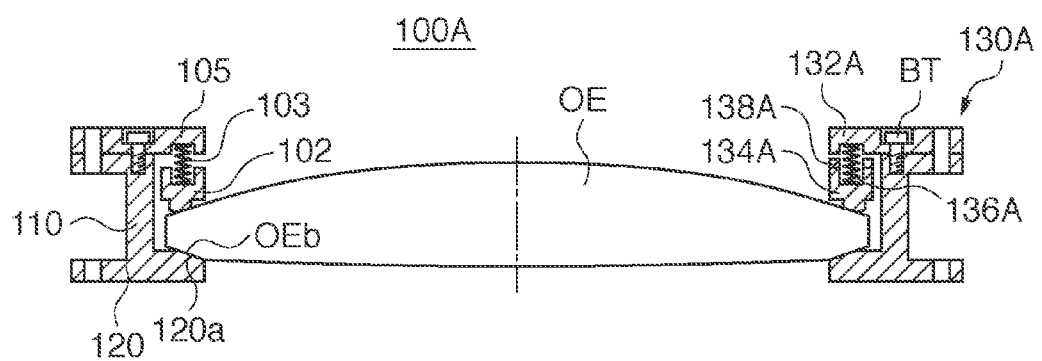

Considering a case in which the first surface SF1 of the optical element OE (outer peripheral portion OEa) has a very large curvature radius or a flat surface, as shown in FIG. 4A. In this case, in the holding apparatus 100A, the spring member 136A applies a compression load to the press ring 134A in the direction of the optical axis AX. Therefore, even when the holding apparatus 100A tilts in the gravity direction, the optical element OE may move in a direction other than the direction perpendicular to the optical axis AX. As shown in FIG. 4B, an inclined plane OEb with a slope of about 10° with respect to the direction of the optical axis AX is formed on the first surface SF1 of the optical element OE (outer peripheral portion OEa). Note that it is possible to form the inclined plane OEb in the same procedure as that in which the external diameter of optical element OE is reduced in processing it. As shown in FIG. 4C, a supporting unit 120 (supporting surface 120a) supports the optical element OE with the inclined plane OEb formed on the first surface SF1 of the optical element OE (outer peripheral portion OEa). This enables the optical element OE to move in the direction perpendicular to the optical axis AX on the supporting surface 120a when the holding apparatus 100A tilts in the gravity direction.

Figure 5A:
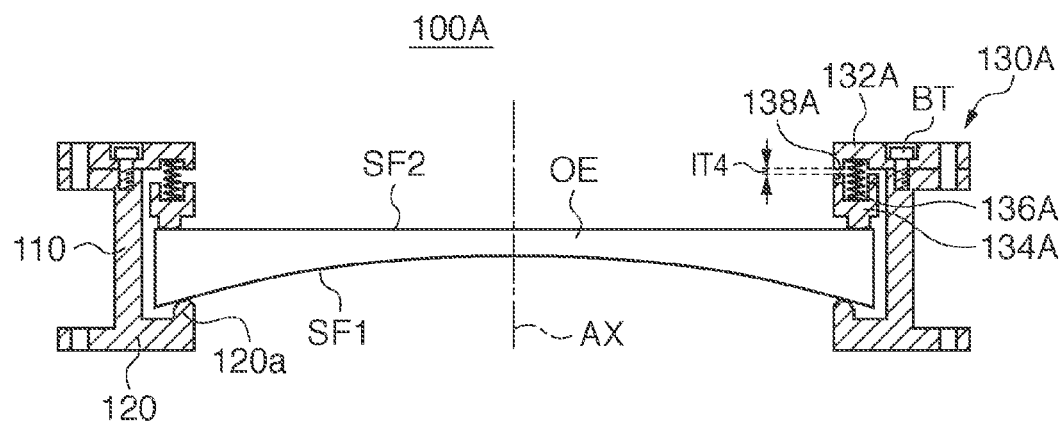
FIGS. 5A and 5B are views for explaining the holding apparatus according to the second embodiment of the present invention.
Figure 5B:
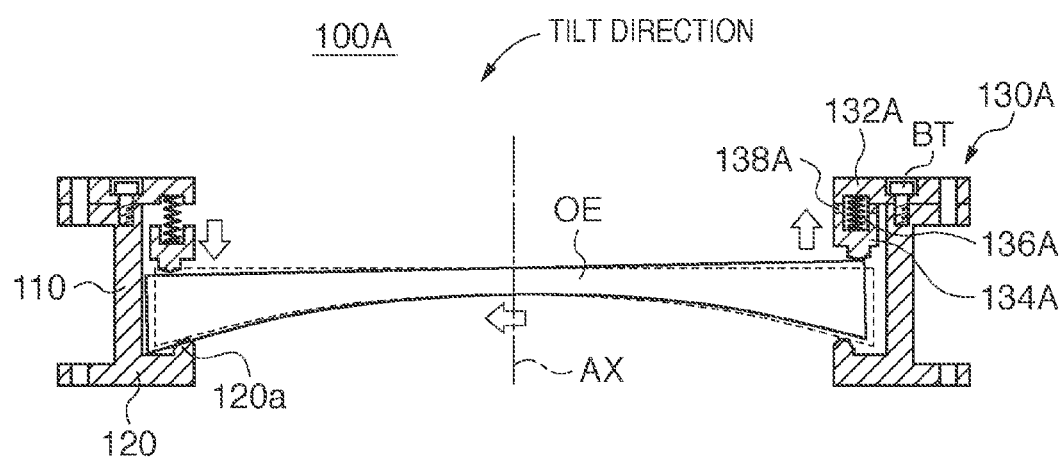

As shown in FIGS. 5A and 5B, even for an optical element OE having a concave first surface SF1 and a flat second surface SF2, a holding apparatus 100A can hold the optical element OE while restricting a range within which the optical element OE can move in a direction perpendicular to an optical axis AX.

As shown in FIG. 5A, when the optical element OE is positioned at an initial position (a position at which the optical axis AX of the optical element OE and a central axis CX of a lens barrel 110 coincide with each other), there is an interval IT4 between a press plate 132A and a spacer 138A. Note that when an optical system including the holding apparatus 100A holding the optical element OE tilts in the gravity direction, a force acts on the optical element OE in the direction perpendicular to the optical axis AX and consequently the optical element OE moves in the direction perpendicular to the optical axis AX, as shown in FIG. 5B. Then, when the optical element OE moves to some extent, the second surface SF2 of an outer peripheral portion OEa pushes up a press ring 134A to compress a spring member 136A. As a result, the spacer 138A abuts against the press plate 132A and thus the optical element OE cannot move in the direction perpendicular to the optical axis AX any more. Note that at this time, there is a gap between the external diameter of the optical element OE and the internal diameter of the lens barrel 110, so it is not the internal diameter of the lens barrel 110 which restricts the movement of the optical element OE in the direction perpendicular to the optical axis AX.

When holding a convex lens with a biconvex shape (FIGS. 1A to 1C, FIGS. 2A to 2C, and FIGS. 4A to 4C), a restriction unit positioned in a tilt direction of a holding apparatus restricts the movement of the convex lens in a direction perpendicular to an optical axis. On the other hand, when holding a concave lens with a concave bottom surface (FIGS. 5A and 5B), a restriction unit positioned on a side opposite to the tilting direction of a holding apparatus restricts the movement of the concave lens in a direction perpendicular to an optical axis.

The arrangement example including the spring members 136A has been explained above. It is, however, possible to replace the spring members 136A with other push members having a function of compressing the press ring 134A against the second surface SF2 while allowing displacement of the press ring 134A in the direction of the optical axis (the axis of the lens barrel). Such push member includes, for example, an elastic member other than a spring member, or an actuator (such as an electromagnetic actuator or fluid actuator) controlled to generate a given force.

Third Embodiment

Figure 6:
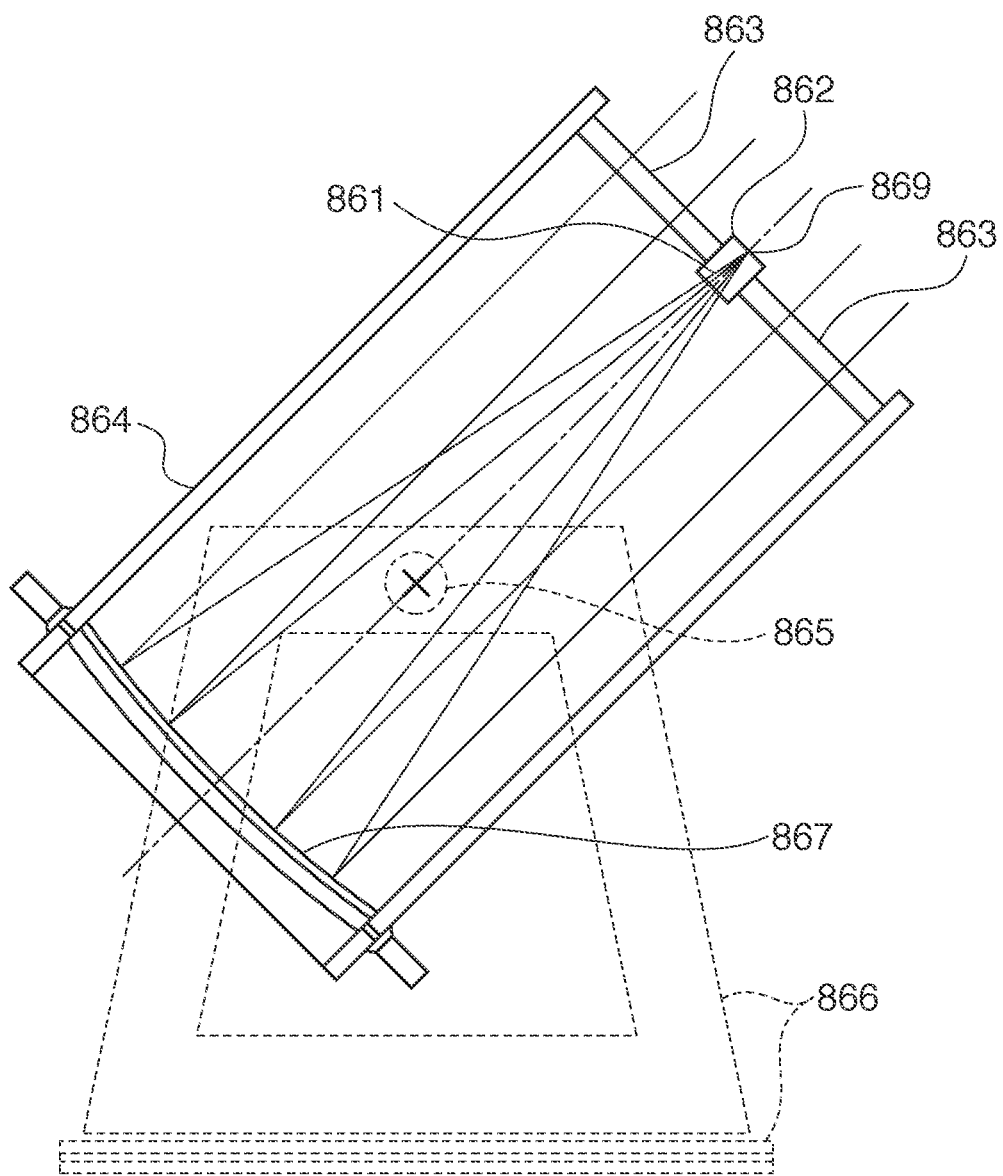
FIG. 6 is a view showing the arrangement of a reflecting telescope according to the third embodiment of the present invention.
Figure 7A:
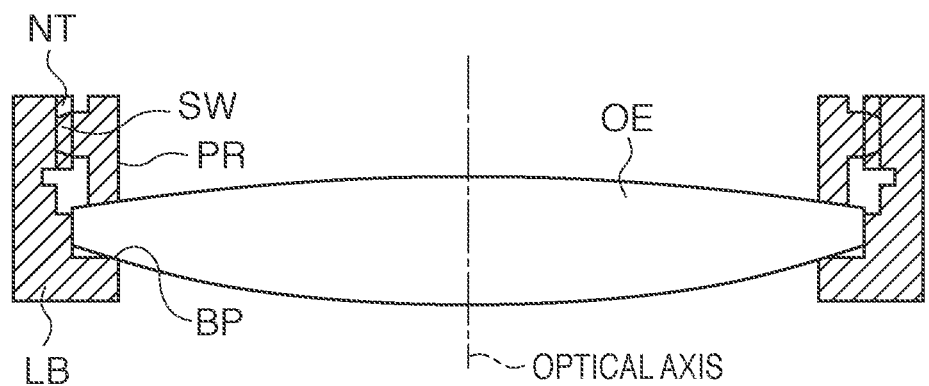
FIGS. 7A and 7B are views each showing the arrangement of a conventional holding apparatus.
Figure 7B:
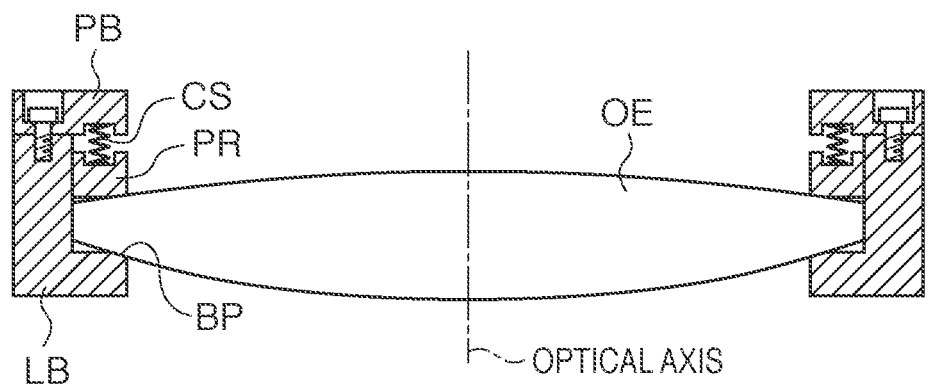

With reference to FIG. 6, a reflecting telescope according to the third embodiment of the present invention will be described. A mount 866 supports a telescope, and has a function of pointing the telescope to an observation direction. The mount 866 also holds a housing 864 through a joint 865. A main reflecting mirror 867 is disposed on the bottom surface of the housing 864. A camera unit lens barrel 862 fixed on a frame 863 is disposed on the upper right side of the housing 864.

Referring to FIG. 6, a light flux incident on the housing 864 from upper right celestial bodies passes across the frame 863, and is then reflected by the main reflecting mirror 867. The light flux reflected by the main reflecting mirror 867 serving as a parabolic mirror travels to the focus of the main reflecting mirror 867. Near the focus of the main reflecting mirror 867, there is disposed a camera unit including a lens system 861 for forming a high quality image on a solid-state image sensor 869.

The lens system 861 includes various optical elements, and for example, is configured by an aberration compensation system disclosed in Japanese Patent Laid-Open No. 6-230274 and the like. The various optical elements included in the lens system 861 and at least one optical element in the main reflecting mirror 867 are held by a holding apparatus 100 or 100A. Even if the housing 864 tilts in the gravity direction, it is possible to suppress the movement of an optical element held by the holding apparatus 100 or 100A in a direction perpendicular to the optical axis within a tolerance, thereby preventing degradation in optical performance. Note that the holding apparatus of the present invention is also applicable to an optical apparatus other than a telescope including a large diameter optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2010-098126 filed on Apr. 21, 2010, which is hereby incorporated by reference herein in its entirety.

What is claimed is:

1. A holding apparatus for holding an optical element with an edge whose thickness increases or decreases inwardly, the apparatus comprising:
a barrel having an internal diameter larger than an external diameter of the optical element;
a support configured to support and position the optical element relative to the barrel via a first surface of the edge in a direction of an axis of the barrel; and
a restriction device including a regulation member which faces a second surface of the edge opposite to the first surface in the direction of the axis, is apart from the second surface if an amount of decentering of the optical element is less than a predetermined amount within a tolerance, and contacts with the second surface if the amount of decentering reaches the predetermined amount, and configured to restrict decentering of the optical element.

2. An optical apparatus including an optical element, the optical apparatus comprising:
a holding apparatus defined in claim 1 for holding the optical element.

3. A telescope including an optical element, the telescope comprising:
a holding apparatus defined in claim 1 for holding the optical element.

4. A holding apparatus for holding an optical element with an edge whose thickness increases or decreases inwardly, the apparatus comprising:
a barrel having an internal diameter larger than an external diameter of the optical element;
a support configured to support and position the optical element relative to the barrel via a first surface of the edge in a direction of an axis of the barrel; and
a restriction device including a regulation member disposed to face a second surface of the edge opposite to the first surface in the direction of the axis, a press member disposed between the second surface and the regulation member, and a push member configured to push the press member onto the second surface with displacement of the press member in the axial direction of the axis allowed,
wherein the restriction device is configured such that there is an interval between the regulation member and the press member if an amount of decentering of the optical element is less than a predetermined amount within a tolerance, and the regulation member and the press member contact with each other to restrict decentering of the optical element if the amount of decentering reaches the predetermined amount.

5. The apparatus according to claim 4, wherein at least one of the regulation member and or the press member includes an adjustment member configured to adjust the interval between the regulation member and the press member.

6. The apparatus according to claim 5, wherein the adjustment member includes a spacer.

7. The apparatus according to claim 4, wherein the push member includes a spring.

8. An optical apparatus including an optical element, the optical apparatus comprising:
   a holding apparatus defined in claim 4 for holding the optical element.

9. A telescope including an optical element, the telescope comprising:
   a holding apparatus defined in claim 4 for holding the optical element.

* * * * *